Jan. 23, 1968 — B. F. HINDERER — 3,364,809
METHOD OF ASSEMBLING A SOLID PROPELLANT GRAIN
Filed July 26, 1965
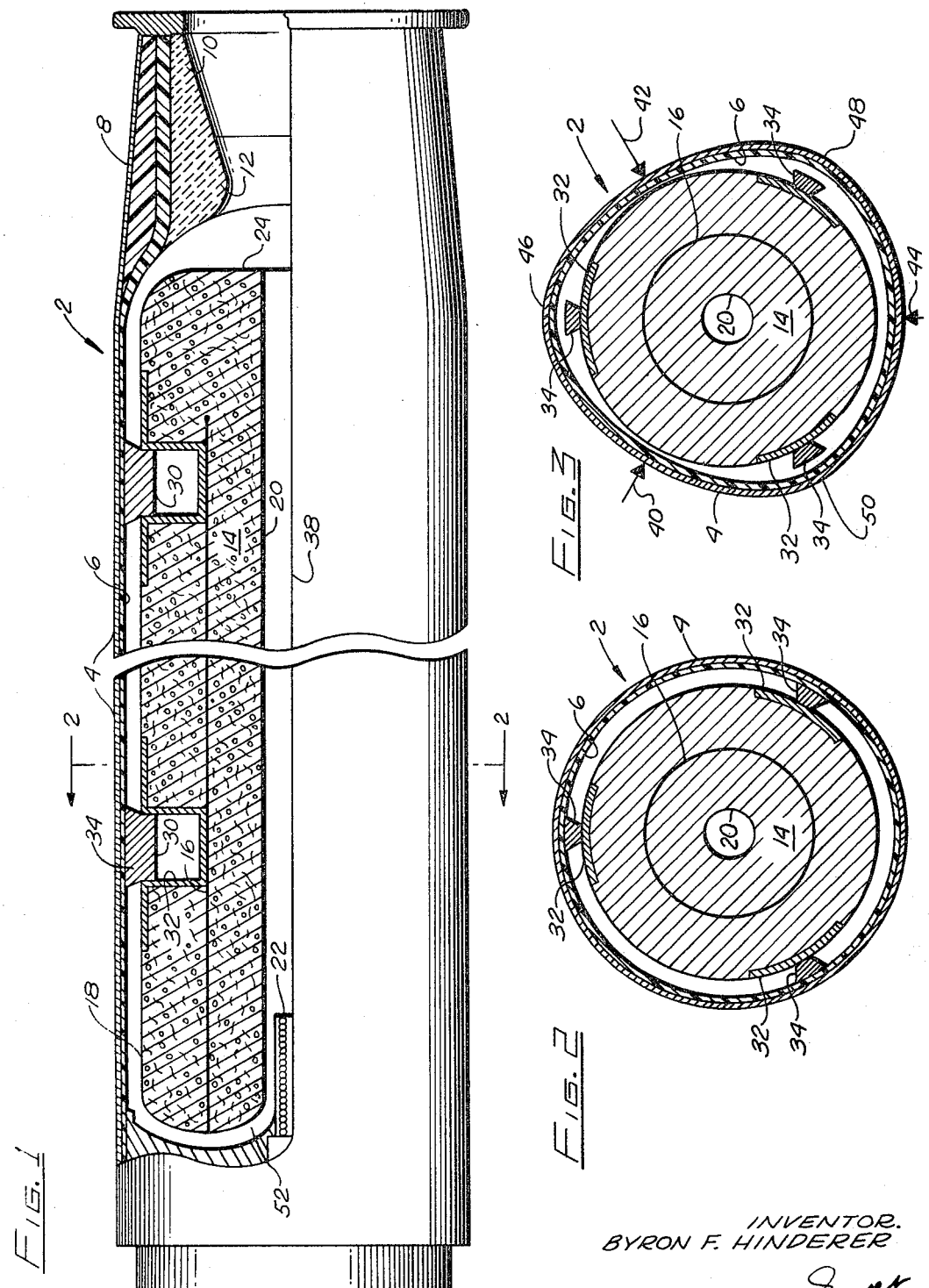
INVENTOR.
BYRON F. HINDERER
BY Donald W. Graver
ATTORNEY

United States Patent Office 3,364,809
Patented Jan. 23, 1968

3,364,809
METHOD OF ASSEMBLING A SOLID
PROPELLANT GRAIN
Byron F. Hinderer, Austin, Tex., assignor to
North American Aviation, Inc.
Filed July 26, 1965, Ser. No. 475,628
2 Claims. (Cl. 86—1)

ABSTRACT OF THE DISCLOSURE

A procedure for assembling a cylindrical propellant grain having a plurality of support legs extending beyond its exterior periphery into a casing and ultimately causing the casing to firmly retain the grain. The casing is subjected to inwardly applied radial forces, deforming alternate portions of its wall into bulged and contracted configurations. The grain is then inserted with the support legs aligned with the bulged portions. Relaxation of the forces causes the casing to return to its original shape to bear against and firmly grip the grain.

---

This invention relates to mountings for solid propellant rocket motors.

More particularly, this invention relates to a method for inserting and removing a solid propellant grain structure into a case.

A typical solid propellant motor comprises a solid propellant grain which, when ignited, undergoes combustion with the resultant gases directed through a nozzle to produce usable thrust. A typical configuration consists of a hollow cylindrical solid propellant mass which burns externally and interiorly simultaneously. On the outside of the grain, there is usually a case which confines the gases burning interiorly so that they may be redirected rearwardly through the nozzle structure.

Usually, the outer case is thin walled and means are provided between the case and the solid propellant grain so that grain is held in position. Previous grain support systems were of two basic types.

One type of support system consisted of a number of sponge rubber pads which were bonded to the propellant grain. The grain was then forced into the case, thus loading the pads in compression. The grain was held in place either by friction or by a bond between the pads and the case. This system suffers several disadvantages. For example, if the pads are bonded to the case, the grain cannot be readily unloaded without damage to either the pads, the case or the grain.

Another disadvantage, if the pads are not bonded, resides in the effect of acceleration forces which can cause movement of the grain within the case.

To assure sufficient bonding, the pads must of necessity be relatively wide. Since there must be an adaquate flow channel for propellant gases between the case and the grain, the relatively wide pads limit the maximum grain size.

Another type of support system is one in which a rigid metal or plastic support system is cast into the propellant grain. In this type, the support system is usually fastened securely to the head end of the case which forms the closure for the opening through which the grain is inserted. This type suffers the disadvantage that unless a significant bond is used between the case and the support system, cyclic loading or vibration can cause relative motion which can produce undesirable friction. Furthermore, when there is bonding, the grain cannot be readily removed from the case.

The system according to this invention obviates the above enumerated disadvantages and, in addition, provides a simple and yet effective method of loading a solid propellant grain or other elements into a case. The method according to this invention consists of providing a grain with support legs protruding therefrom which is inserted into a thin walled case. The case is deformed by applying radial forces thereto so that outwardly bulging portions result. The legs on the grain are aligned with these outwardly bulging portions and inserted into the case. The forces are then removed which allows the case to return to its original position. Since the support legs are located at a slightly larger distance from the center of the grain than the internal or inside radius of the case, an interference fit results. To remove the grain, the opposite operation is employed.

It is therefore an object of this invention to provide an improved method for loading a propellant grain or other element into a case structure.

Other objects and advantages of this invention will become apparent as this description proceeds taken in conjunction with the drawings in which:

FIG. 1 is a view partially in cross-section of a solid propellant rocket motor embodying this invention, FIG. 2 is a view taken along line 2—2 of FIG. 1, and FIG. 3 is a cross-sectional view of the case and propellant grain during removal or insertion of the grain in the case.

Referring now to FIG. 1, there was shown a view partially in cross-section of a rocket motor designated generally at 2. This motor includes an outer case 4 which may be constructed of steel with a glass phenolic liner 6 which acts as an insulation. Case 4 at the rearward portion thereof has attached thereto as by welding a wall 8 and a nozzle insert 10. This insert forms a throat in point 12 and then diverges to form the nozzle.

Within case 6 is a solid propellant grain 14 which includes a grain support member 16. Member 16 may comprise metal or plastic depending upon the particular solid propellant grain used. Propellant grain 14 has an exterior surface 18 and an interior surface 20. An igniter 22 which can be initiated by means not shown is used to ignite the propellant. Upon ignition, the propellant grain 14 will burn on surfaces 20, 18 and 24 to produce combustion gases which exit through throat 12 to produce thrust in the normal manner. Gases can pass through passage 52 and then exteriorly of grain 14.

To support propellant grain 14 within case 4, support legs 30 are provided. Support legs 30 are restrained by reinforcing elements 32 which are embedded in propellant grain 14 as by casting during formation of the grain.

The outermost portion 34 of legs 30 have a slightly larger distance from the center line 38 of grain 14 than the normal internal radius of case 4 and insulation 6 so that there is an interference fit. The dimension from the surface 34 to the center line 38 of grain 14 is preferably approximately 1 percent greater than the undeformed internal radius of case 4.

FIG. 2 which is a view taken along the lines 2—2 of FIG. 1 is illustrative of the assembled grain within case 4. In FIG. 3, the method of this invention by which the grain is assembled within case 4 is shown. Without utilizing the method of this invention, it can be seen that since the diametrical distance represented by support legs 30 is greater than the internal diameter of case 4 that the grain cannot be inserted into the case. However, it has been found by applicant that if forces in the direction of arrows 40, 42 and 44 are applied, that portions 46, 48 and 50 will be bulged outwardly thus allowing the grain to be inserted if the legs are aligned with these outwardly bulging portions. Although three sets of legs are shown, it is within the scope of this invention to employ any number of legs and to apply the forces in a similar manner. After the grain is inserted, the forces are removed resulting in an interference fit as previously described and as illustrated in FIG. 2. It is important that the elastic limit of case 4 not be exceeded so that it may return to its original position. When it is desired to remove the grain from the case, the opposite procedure is employed.

The forces shown by arrows 40, 42 and 44 can be the result of axially extending longitudinal ribs. These forces can also be applied by point loads approximately in the vicinity of support legs 30 although as described previously not at the legs themselves. The actuating forces itself can be applied by hydraulic rams or other conventional force applying devices.

Having described the invention with particularity, it is intended that the scope of the invention be limited only by the claims appended hereto.

I claim:
1. A method of assembling a solid propellant grain in a thin-walled cylindrical case, said grain having a plurality of support legs on the outside thereof, said support legs each having an outside portion located a distance from the center of said grain substantially equal to the inside radius of said case which comprises;

applying a deforming force to said case whereby portions of said case are forced radially outwardly, positioning said grain relative to said case so that the legs are aligned with the outwardly deformed portion of said case, inserting said grain into said case, and removing said deforming force, whereby said legs are clamped by said case to prevent relative movement between the grain and case.

2. A method according to claim 1 wherein the distance from the outside portion of said legs to the center of said grain is slightly larger than the outside radius of said case and the deforming force is applied radially inwardly.

References Cited

UNITED STATES PATENTS

| 3,032,970 | 5/1962 | Fox | 102—98 X |
| 3,295,293 | 1/1967 | Ludding | 53—40 |

FOREIGN PATENTS

| 26,430 | 7/1908 | Great Britain. |

BENJAMIN A. BORCHELT, *Primary Examiner.*

SAMUEL FEINBERG, *Examiner.*

P. A. SHANLEY, *Assistant Examiner.*